(12) United States Patent
Gudapati et al.

(10) Patent No.: US 11,872,869 B2
(45) Date of Patent: Jan. 16, 2024

(54) SYSTEMS AND METHODS FOR ENSURING DRIVABILITY FOR BATTERY ELECTRIC VEHICLES DURING EXTREME COLD WEATHER CONDITIONS

(71) Applicants: Abhilash Gudapati, Troy, MI (US); Rudolf Kharpuri, Auburn Hills, MI (US); Kevin L Mason, Farmington Hills, MI (US); Francesco Ciulla, Rochester, MI (US)

(72) Inventors: Abhilash Gudapati, Troy, MI (US); Rudolf Kharpuri, Auburn Hills, MI (US); Kevin L Mason, Farmington Hills, MI (US); Francesco Ciulla, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 245 days.

(21) Appl. No.: 17/412,454

(22) Filed: Aug. 26, 2021

(65) Prior Publication Data

US 2023/0063212 A1    Mar. 2, 2023

(51) Int. Cl.
*B60H 1/14* (2006.01)
*B60W 50/14* (2020.01)
*B60L 58/27* (2019.01)

(52) U.S. Cl.
CPC ............ *B60H 1/143* (2013.01); *B60W 50/14* (2013.01); *B60L 58/27* (2019.02); *B60L 2240/545* (2013.01); *B60L 2240/547* (2013.01); *B60L 2250/16* (2013.01); *B60W 2050/146* (2013.01); *B60W 2422/00* (2013.01); *B60W 2510/244* (2013.01); *B60W 2540/06* (2013.01)

(58) Field of Classification Search
None
See application file for complete search history.

(56) References Cited

U.S. PATENT DOCUMENTS

| | | | | |
|---|---|---|---|---|
| 9,308,911 B2 * | 4/2016 | Kohlberger | ............... | B60L 1/08 |
| 9,914,462 B2 * | 3/2018 | Porras | ............. | B60W 30/18054 |
| 10,596,912 B2 * | 3/2020 | Sakakibara | ............. | B60L 53/14 |
| 10,604,028 B1 * | 3/2020 | Muniz | ..................... | B60L 58/16 |
| 10,640,004 B2 * | 5/2020 | Patel | ..................... | B60L 58/12 |
| 10,981,469 B2 * | 4/2021 | Muniz | ..................... | B60L 58/16 |
| 11,133,537 B2 * | 9/2021 | King | ................... | H02J 7/00034 |

(Continued)

FOREIGN PATENT DOCUMENTS

| | | | | |
|---|---|---|---|---|
| CN | 104904090 A | * | 9/2015 | ............. B60L 53/11 |
| CN | 105515133 A | * | 4/2016 | |

(Continued)

*Primary Examiner* — Kevin R Steckbauer
(74) *Attorney, Agent, or Firm* — Jeremy J. Klobucar

(57) ABSTRACT

A battery control system for a battery electric vehicle is configured to detect that a driver door of the vehicle has been opened and connect the battery system to an electrical system of the vehicle to power at least a cabin heater and defroster of the vehicle, detect a driver start request, determine whether a set of battery parameters satisfy a threshold indicative of the battery system being sufficiently conditioned for driving of the vehicle, and when the set of battery parameters satisfy the threshold, display, via the user interface, a first message indicating that the vehicle is ready to drive and allow the driver to drive the vehicle and driving is prevented.

14 Claims, 4 Drawing Sheets

(56) References Cited

U.S. PATENT DOCUMENTS

| | | | | |
|---|---|---|---|---|
| 2004/0100225 | A1* | 5/2004 | Neil | H02J 7/0047 320/109 |
| 2014/0041826 | A1* | 2/2014 | Takeuchi | B60L 1/08 165/10 |
| 2014/0277869 | A1* | 9/2014 | King | B60W 10/00 701/22 |
| 2014/0316630 | A1* | 10/2014 | Kohlberger | B60L 53/11 701/22 |
| 2016/0375785 | A1* | 12/2016 | Liu | B60L 15/20 701/22 |
| 2017/0033417 | A1* | 2/2017 | Basu | F28D 15/00 |
| 2017/0210390 | A1* | 7/2017 | Porras | B60K 6/40 |
| 2018/0345816 | A1* | 12/2018 | Sakakibara | B60Q 9/00 |
| 2023/0063212 | A1* | 3/2023 | Gudapati | B60H 1/00985 |
| 2023/0067827 | A1* | 3/2023 | Bernatchez | H01M 10/653 |

FOREIGN PATENT DOCUMENTS

| | | | | |
|---|---|---|---|---|
| CN | 105835710 | A * | 8/2016 | B60L 1/003 |
| CN | 104904090 | B * | 4/2018 | B60L 53/11 |
| CN | 108146269 | A * | 6/2018 | B60L 53/14 |
| CN | 108973708 | A * | 12/2018 | B60L 3/0046 |
| CN | 110154822 | A * | 8/2019 | |
| CN | 110562094 | A * | 12/2019 | |
| CN | 110712558 | A * | 1/2020 | B60L 53/65 |
| CN | 105835710 | B * | 3/2020 | B60L 1/003 |
| CN | 111030224 | A * | 4/2020 | |
| CN | 112060939 | A * | 12/2020 | |
| CN | 112109588 | A * | 12/2020 | |
| CN | 112789758 | A * | 5/2021 | |
| CN | 113119795 | A * | 7/2021 | B60L 58/12 |
| CN | 213619436 | U * | 7/2021 | B60L 53/31 |
| CN | 113895310 | A * | 1/2022 | |
| CN | 114609533 | A * | 6/2022 | |
| CN | 114670692 | A * | 6/2022 | |
| CN | 114725579 | A * | 7/2022 | |
| CN | 108973708 | B * | 8/2022 | B60L 3/0046 |
| CN | 113119795 | B * | 10/2022 | B60L 58/12 |
| CN | 115275443 | A * | 11/2022 | |
| CN | 115357806 | A * | 11/2022 | |
| CN | 115520041 | A * | 12/2022 | |
| CN | 115871521 | A * | 3/2023 | B60L 1/003 |
| DE | 102016101100 | A1 * | 8/2016 | B60L 1/003 |
| DE | 102017101212 | A1 * | 7/2017 | B60K 6/40 |
| EP | 4140802 | A1 * | 3/2023 | B60L 1/003 |
| WO | WO-2011093137 | A1 * | 8/2011 | B60H 1/00278 |
| WO | WO-2022095469 | A1 * | 5/2022 | B60L 53/14 |
| WO | WO-2023024917 | A1 * | 3/2023 | |

* cited by examiner

SYSTEMS AND METHODS FOR ENSURING DRIVABILITY FOR BATTERY ELECTRIC VEHICLES DURING EXTREME COLD WEATHER CONDITIONS

FIELD

The present application generally relates to battery electric vehicles (BEVs) and, more particularly, to systems and methods for ensuring drivability during extreme cold weather conditions for BEVs.

BACKGROUND

A typical battery electric vehicle (BEV) includes an electrified powertrain having a high voltage battery system that powers one or more electric motors to generate and transfer (e.g., via a transmission or the like) drive torque to a driveline of the BEV for propulsion. This high voltage battery system is rechargeable, typically via an external charging unit or station. A BEV may be able to start but may have very limited power limits, which results in a very limited range for the driver and leads to a potential opportunity for being stranded, particularly during extreme cold weather driving. In addition, these limited power limits may prevent the use of components such as a battery heater and a cabin heater/defroster, which may make the experience even more unpleasant for the driver and vehicle occupants. Conventional solutions allow driving with unclear messaging to the driver about the state (and future performance) of the BEV, and/or require the driver to read the BEV's instruction manual. Accordingly, while such conventional BEV battery control systems and methods do work for their intended purpose, there exists an opportunity for improvement in the relevant art.

SUMMARY

According to one example aspect of the invention, a battery control system for a battery electric vehicle is presented. In one exemplary implementation, the battery control system comprises a set of sensors configured to monitor a set of battery parameters of a battery system of the vehicle, the set of battery parameters comprising at least a state of charge and a temperature of the battery system, a user interface configured to receive inputs from a driver of the vehicle and display messages to the driver, and a controller in communication with the set of sensors and the user interface and configured to detect that a driver door of the vehicle has been opened and connect the battery system to an electrical system of the vehicle to power at least a cabin heater and defroster of the vehicle, detect a driver start request and active propulsion systems and enable driver control of the cabin heater and defroster of the vehicle, determine whether the set of battery parameters satisfy a threshold indicative of the battery system being sufficiently conditioned for driving of the vehicle, when the set of battery parameters satisfy the threshold, display, via the user interface, a first message indicating that the vehicle is ready to drive and allow the driver to drive the vehicle and driving is prevented, and when the set of battery parameters does not satisfy the threshold, display, via the user interface, a second message that the vehicle is not ready to drive and should be plugged-in to an external charging system for conditioning of the battery system, and in response to the vehicle being plugged-in to the external charging system, allow the driver to remain in the vehicle with control of the cabin heater and defroster until the battery system is sufficiently conditioned.

In some implementations, in response to the vehicle being unplugged from the external charging system, the controller is further configured to determine whether the set of battery parameters satisfy a threshold indicative of the battery system being sufficiently conditioned for driving of the vehicle. In some implementations, when the set of battery parameters satisfy the threshold, display, via the user interface, the first message indicating that the vehicle is ready to drive and allow the driver to drive the vehicle, and when the set of battery parameters does not satisfy the threshold, display, via the user interface, the second message that does not indicate that the vehicle is ready to drive and should be plugged-in to the external charging system for conditioning of the battery system.

In some implementations, the controller is further configured to display, via the user interface, a third message indicating that a drive request maneuver is not allowed and a drive start disablement state. In some implementations, the controller is configured to display, via the user interface, the third message in response to the driver attempting to shift the vehicle into gear. In some implementations, the controller is further configured to receive an override request from the driver after displaying the third message and entering the drive start disablement state.

In some implementations, the controller is further configured to determine whether the display, via the user interface, of the third message has been disabled either due to sufficient conditioning of the battery system being achieved or the driver unplugging the vehicle from the external charging system. In some implementations, the controller is further configured to determine whether the set of battery parameters satisfy a critical threshold less than the threshold, the critical threshold being indicative of the battery system being insufficiently conditioned for any driving of the vehicle, and when the set of battery parameters satisfy the critical threshold, allow the driver to drive the vehicle.

In some implementations, the controller is further configured to when the set of battery parameters satisfy the critical threshold and the vehicle is not in the drive ready disablement state display, via the user interface, the first message followed by a fourth message indicating that the driver should plug-in the vehicle to the external charging system for conditioning of the battery system, and allow the driver to drive the vehicle. In some implementations, the controller is further configured to when the set of battery parameters satisfy the critical threshold and the vehicle is in the drive ready disablement state when the vehicle is running after the driver start request and the driver unplugs the vehicle from the external charging unit, allow the driver to shift the vehicle into a drive, neutral, or reverse gear while simultaneously depressing the brake pedal for a threshold period.

According to another example aspect of the invention, a battery control method for a battery electric vehicle is presented. In one exemplary implementation, the battery control method comprises communicating, by a controller of the vehicle, with a set of sensors configured to monitor a set of battery parameters of a battery system of the vehicle, the set of battery parameters comprising at least a state of charge and a temperature of the battery system, detecting, by the controller, that a driver door of the vehicle has been opened and connect the battery system to an electrical system of the vehicle to power at least a cabin heater and defroster of the vehicle, detecting, by the controller, a driver start request and active propulsion systems and enable driver control of the cabin heater and defroster of the vehicle, determining, by the controller, whether the set of battery parameters satisfy a threshold indicative of the battery system being sufficiently conditioned for driving of the vehicle, when the set of battery parameters satisfy the threshold, displaying, by the controller via a user interface configured to receive inputs from a driver of the vehicle and display messages to the driver, a first message indicating that the vehicle is ready to drive and allow the driver to drive the vehicle, and when the set of battery parameters does not satisfy the threshold, displaying, by the controller via the user interface, a second message that the vehicle is not ready to drive and should be plugged-in to an external charging system for conditioning of the battery system, and in response to the vehicle being plugged-in to the external charging system, allowing, by the controller, the driver to remain in the vehicle with control of the cabin heater and defroster until the battery system is sufficiently conditioned.

In some implementations, the method further comprises in response to the vehicle being unplugged from the external charging system, determining, by the controller, whether the set of battery parameters satisfy a threshold indicative of the battery system being sufficiently conditioned for driving of the vehicle. In some implementations, the method further comprises when the set of battery parameters satisfy the threshold, displaying, by the controller via the user interface, the first message indicating that the vehicle is ready to drive and allow the driver to drive the vehicle, and when the set of battery parameters does not satisfy the threshold, displaying, by the controller via the user interface, the second message that the vehicle is not ready to drive and should be plugged-in to the external charging system for conditioning of the battery system.

In some implementations, the method further comprises displaying, by the controller via the user interface, a third message indicating that a drive request maneuver is not allowed and a drive start disablement state. In some implementations, the method further comprises displaying, by the controller via the user interface, the third message in response to the driver attempting to shift the vehicle into gear. In some implementations, the method further comprises receiving, by the controller, an override request from the driver after displaying the third message and entering the drive start disablement state.

In some implementations, the method further comprises determining, by the controller, whether the display, via the user interface, of the third message has been disabled either due to sufficient conditioning of the battery system being achieved or the driver unplugging the vehicle from the external charging system. In some implementations, the method further comprises determining, by the controller, whether the set of battery parameters satisfy a critical threshold less than the threshold, the critical threshold being indicative of the battery system being insufficiently conditioned for any driving of the vehicle, and when the set of battery parameters satisfy the critical threshold, allowing, by the controller, the driver to drive the vehicle.

In some implementations, the method further comprises when the set of battery parameters satisfy the critical threshold and the vehicle is not in the drive ready disablement state displaying, by the controller via the user interface, the first message followed by a fourth message indicating that the driver should plug-in the vehicle to the external charging system for conditioning of the battery system, and allowing, by the controller, the driver to drive the vehicle. In some implementations, the method further comprises when the set of battery parameters satisfy the critical threshold and the vehicle is in the drive ready disablement state when the vehicle is running after the driver start request and the driver unplugs the vehicle from the external charging unit, allow the driver to shift the vehicle into a drive, neutral, or reverse gear while simultaneously depressing the brake pedal for a threshold period.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, a battery electric vehicle (BEV) may be able to start but may have very limited power limits, which results in a very limited range for the driver and leads to potential safety concerns, particularly during extreme cold weather driving. In addition, these limited power limits may prevent the use of components such as a battery heater and a cabin heater/defroster, which makes the experience even more unpleasant for the driver and vehicle occupants. Conventional solutions prevent cranking with no cabin heating/defrosting, allow driving with unclear messaging to the driver about the state (and future performance) of the BEV, require the driver to read the BEV's instruction manual. These conventional solutions result in a poor user experience, and also present safety concerns as the driver could end up stranded (e.g., particularly in extreme cold weather conditions) without having been properly instructed as to the chances of such a situation occluding. Accordingly, improved battery control systems and methods for BEVs are presented herein.

These systems and methods provide clear user messaging to plug-in the BEV for battery conditioning while also providing cabin heating/defrosting capability to improve the driver's comfortability during battery conditioning. These user human machine interface (HMI) messages are clearly displayed and will initially instruct the driver to plug-in for batter conditioning, then keep vehicle plugged-in while conditioning in progress, after which the vehicle is able to drive (while potentially preventing a shift from drive// neutral/reverse, also referred to herein as "drive ready disablement") and cabin heating/defrosting utilized. Once a sufficient battery conditioning state has been reached, a ready message is be displayed to the driver, and they can then unplug the BEV and proceed with driving. In one embodiment, a driver override of the drive ready disablement feature is provided, including additional messaging to instruct the driver that additional battery conditioning is necessary. Potential benefits include an improved driver experience and preventing stranding drivers with no charge in extreme cold temperatures.

Figure 1:
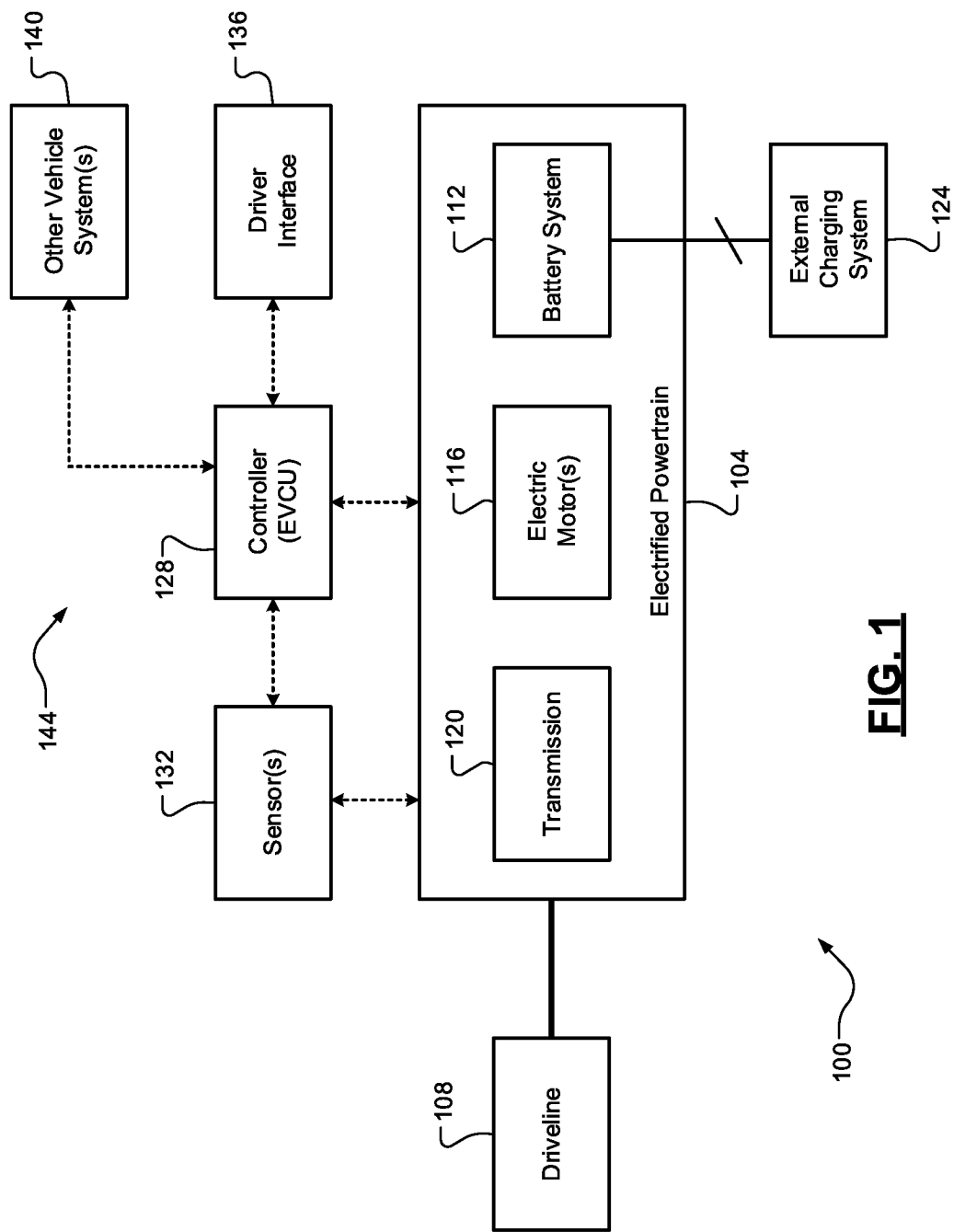
FIG. 1 is a functional block diagram of an example battery electric vehicle (BEV) according to the principles of the present application.

Referring now to FIG. 1, a functional block diagram of an example BEV 100 (also referred to herein as "vehicle 100") according to the principles of the present application is illustrated. The vehicle 100 includes an electrified powertrain 104 configured to generate and transfer drive torque to a driveline 108 of the vehicle 100 for propulsion. The electrified powertrain 104 generally comprises a high voltage battery system 112 (also referred to herein as "battery system 112"), one or more electric motors 116, and a transmission 120. The battery system 112 is selectively connectable (e.g., by the driver) to an external charging system 124 (also referred to herein as "charger 124") for charging of the battery system 112. A controller 128 (also referred to herein as an electrified vehicle control unit, or EVCU 128) is configured to control the electrified powertrain 104 to generate a desired amount of drive torque to meet a driver's request. The controller 128 is also configured to monitor various parameters measured by one or more sensors 132, such as, but not limited to, a state of charge (SOC) of the battery system 112, a temperature of the battery system 112, an ambient temperature, a state/gear of the transmission 120, and other related parameters such as accelerator/brake pedal inputs and a driver door state (open/closed) sensor. The controller 128 is also configured to output messages via a driver interface 136 (e.g., an in-dash display, a center console display, a heads-up display, or some combination thereof). The driver interface 136 could also include other driver input components such as, but not limited to, accelerator/brake pedals, a vehicle start button, a transmission gear selector, and a drive ready disablement requestor. The controller 128 is also configured to control and communicate with other vehicle system(s) 140, such as, but not limited to, a battery heater, a cabin heater, and a defroster. These devices are also generally referred to as an "electrical system 144" of the vehicle 100.

Figure 2A:
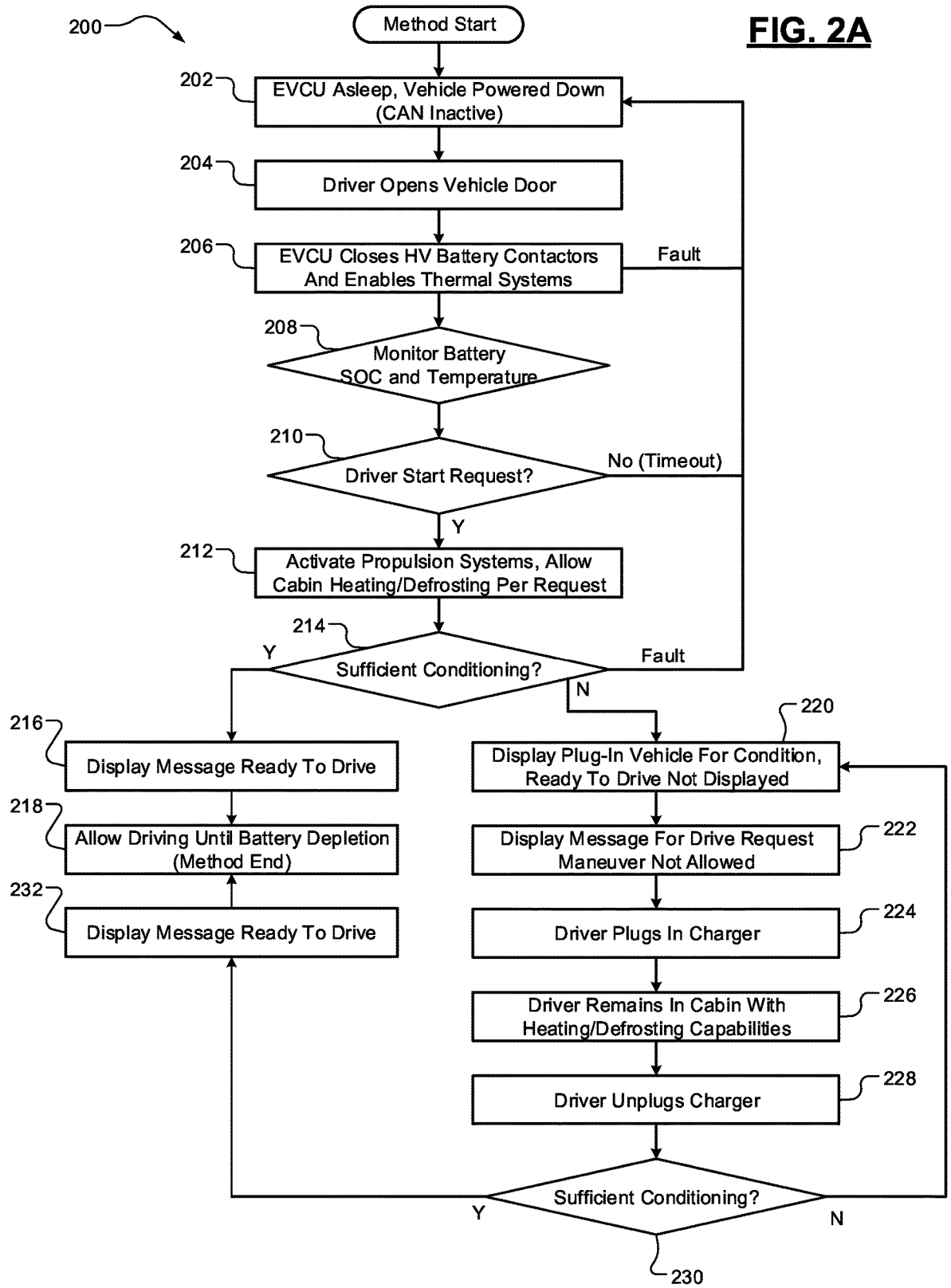
FIG. 2A is a flow diagram of a first example battery control method for a BEV without driver override capability according to the principles of the present application.

Referring now to FIG. 2A, a flow diagram a first example battery control method 200 for a BEV (e.g., BEV 100) without driver override capability according to the principles of the present application is illustrated. At 202 after the method 200 starts, the controller 128 is asleep and the vehicle 100 is powered down (e.g., a controller area network, or CAN, is inactive). At 204, the driver opens a door (e.g., a driver door) of the vehicle 100. At 206, the controller 128 closes contactors (not shown) to connect the electrical system of the vehicle 100 to the battery system 112. This could include, for example, enabling thermal systems such as the battery heater, the cabin heater, and the defroster (other vehicle system(s) 140). At 208, the controller 128 monitors SOC and temperature of the battery system 112. In some cases, there could be a communication or other malfunction ("Fault") and the method 200 will end or return to 202. At 210, the controller 128 determines whether a driver start request (e.g., via the vehicle start button of the driver interface 136) has been received within a threshold time period. When false, the controller 128 determines a timeout and the method 200 ends or returns to 202. When true, the method 200 proceeds to 212. At 212, the controller 128 activates vehicle propulsion systems (e.g., the electrified powertrain 104) and allows for cabin heating/defrosting per the driver's requests/inputs. At 214, the controller 128 determines whether the battery system 112 is sufficiently conditioned (e.g., SOC/temperature, also referred to as "power limits" herein, greater than a threshold). In some cases, there could be a communication or other malfunction ("Fault") and the method 200 will end or return to 202. When true, the method 200 proceeds to 216. At 216, the controller 128 displays a message to the driver that the vehicle 100 is ready to drive.

It will be appreciated that the phrase "display a message" herefoth refers to the controller 128 commanding the user interface 136 to output/display a message to the driver. At 218, the driver is then able to shift into gear and drive the vehicle 100 until the battery system 112 is depleted and the method 200 ends. When false, the method 200 proceeds to 220. At 220, the controller 128 displays via the user interface 136 a message that the vehicle 100 is not ready to drive and should be "plugged-in" (hereinafter referring to connecting the battery system 112 to the external charging system 124) for conditioning of the battery system 112. At 222, the controller 128 displays a message that a drive request maneuver is not allowed. This could be, for example, in response to the driver attempting to shift the vehicle 100 into gear. At 224, the driver plugs-in the vehicle 100 for charging. At 226, the driver is able to remain in the cabin with cabin heater and defrosting capabilities while battery conditioning is performed. At 228, the driver un-plugs the vehicle 100. At 230, the controller 128 determines whether the battery system 128 is sufficiently conditioned (e.g., power limits greater than a threshold). When false, the method 200 returns to 220. When true, the method 200 proceeds to 232 where the controller 128 displays a message that the vehicle 100 is ready to drive and the method 200 proceeds to and ends at 218.

Figure 2B:
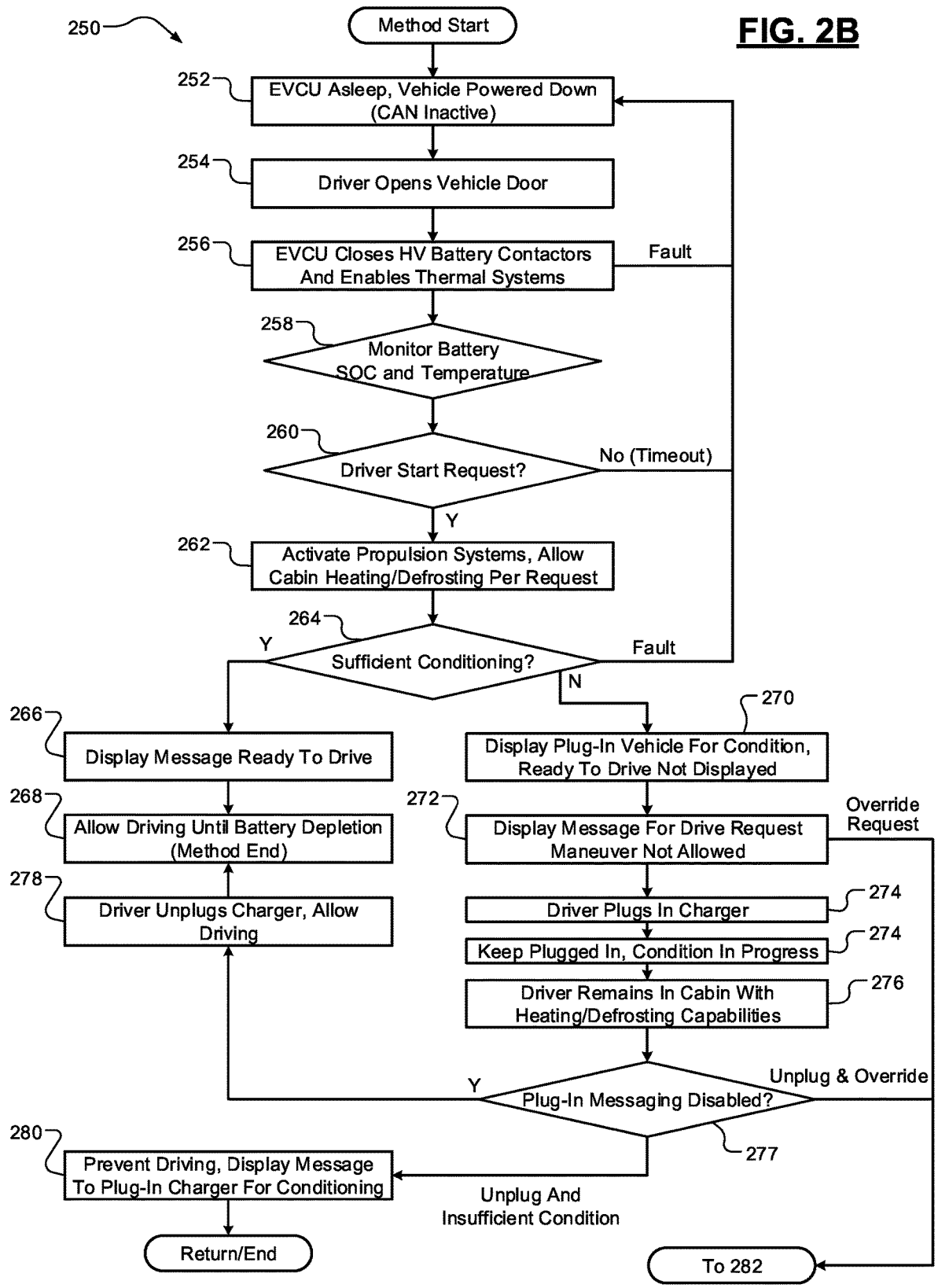
FIGS. 2B-2C are a flow diagram of a second example battery control method for a BEV with driver override capability according to the principles of the present application.
Figure 2C:
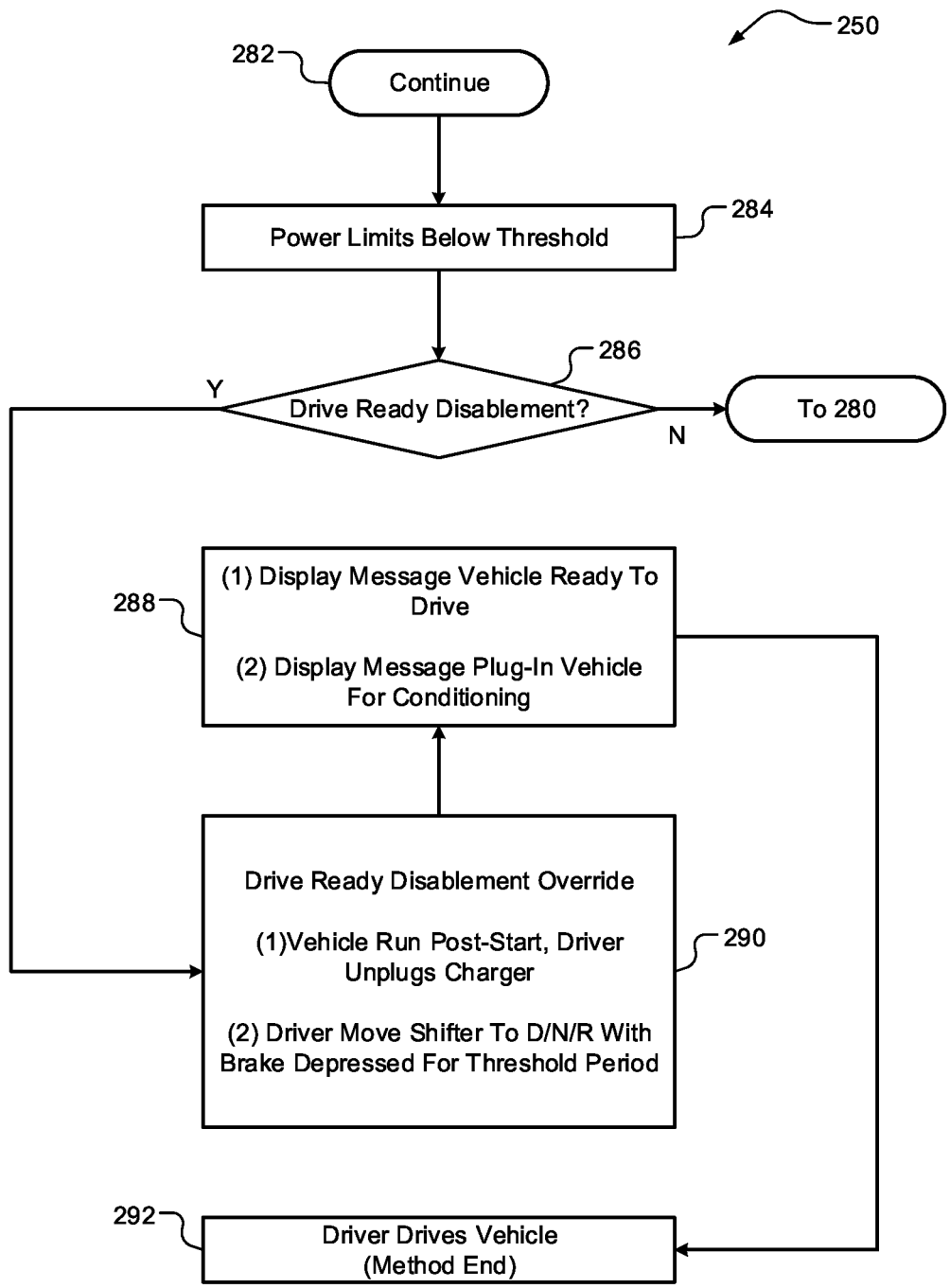

Referring now to FIGS. 2B-2C, a flow diagram of a second example battery control method 250 for a BEV (e.g., BEV 100) with driver override capability according to the principles of the present application is illustrated. Steps or processes 252-276 are the same as corresponding steps or processes 202-226 of FIG. 2A and as described above. The difference in this second battery control method 250 is the capability for a driver override of the drive ready disablement. At 272, the driver could attempt an override (e.g., of the drive ready disablement) even after the message that a drive request maneuver is not allowed (e.g., in response to an initial attempt to shift the vehicle 100 into gear). When this occurs, the method 250 proceeds to 282. Another difference is after 277, the controller 128 determines whether the plug-in messaging (instructing the driver to plug-in the vehicle 100) has been disabled. This could occur, for example, when sufficient conditioning has been achieved and the method 250 could proceed to 278 where the driver is then able to unplug the vehicle 100 and the method 250 then ends at 268. At 274, the driver plugs in the charger and at 275 messaging is displayed to keep the vehicle 100 plugged in as battery conditioning is in progress.

When this is true and there is insufficient battery conditioning (e.g., less than a critical threshold), the method 200 proceeds to 280 where a message instructing the driver to plug-in the vehicle 100 is displayed and the vehicle 100 is prevented from driving (drive ready disablement) and the method 250 ends or returns to monitoring for sufficient battery conditioning. When the unplug and override occurs and the battery conditioning is insufficient but not less than some critical threshold, the method 250 proceeds to 282. Continuing from 282, the power limits of the battery system 212 are insufficient but not critical as previously described. At 286, the controller 128 determines whether the drive ready disablement is already activated (e.g., from a previous attempt to shift the vehicle 100 into gear). When false, the method 200 proceeds to 290. At 290, messaging is displayed that Threshold Drive Ready Disablement Override—(1) Vehicle Run Post-Start, Driver Unplugs Charger and (2) Driver Move Shifter To D/N/R With Brake Depressed For Threshold Period and the method then proceeds to 288. At 288, the controller 128 displays a message that the vehicle 100 is ready to drive and also continues to then display a message that the vehicle 100 should be plugged-in for battery conditioning. The method 200 then proceeds and ends at 292 where the driver is able to drive the vehicle 100. When 286 is false, the method 250 returns to 280. This includes the vehicle being in a run/post-start state and the driver then unplugs the vehicle 100. The driver is then able to move the shifter of driver interface 136 to a gear (drive/neutral/reverse) while also depressing the brake pedal of driver interface 136. This could require these inputs to be held for a threshold period (e.g., 2 seconds) to ensure that the driver in fact intends to perform the override. The method 250 then ends at 292 where the driver is able to drive the vehicle 100.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A battery control system for a battery electric vehicle, the battery control system comprising:
    a set of sensors configured to monitor a set of battery parameters of a battery system of the vehicle, the set of battery parameters including at least a state of charge and a temperature of the battery system;
    a user interface configured to receive inputs from a driver of the vehicle and display messages to the driver;
    a controller in communication with the set of sensors and the user interface and configured to:
        detect that a driver door of the vehicle has been opened and connect the battery system to an electrical system of the vehicle to power at least a cabin heater and defroster of the vehicle;
        detect a driver start request and powered propulsion systems and enable driver control of the cabin heater and defroster of the vehicle;
        determine whether the set of battery parameters satisfy a threshold indicative of the battery system being sufficiently conditioned for driving of the vehicle;
        when the set of battery parameters satisfy the threshold, display, via the user interface, a first message indicating that the vehicle is ready to drive and allow the driver to drive the vehicle;
        when the set of battery parameters does not satisfy the threshold, display, via the user interface, a second message that the vehicle is not ready to drive and should be plugged-in to an external charging system for conditioning of the battery system;
        in response to the vehicle being plugged-in to the external charging system, allow driver control of the cabin heater and defroster until the battery system is sufficiently conditioned; and
        display, via the user interface, a third message indicating that a drive request maneuver is not allowed and a drive start disablement state.

2. The battery control system of claim 1, wherein the controller is configured to display, via the user interface, the third message in response to the driver attempting to shift the vehicle into gear.

3. The battery control system of claim 1, wherein the controller is further configured to receive an override request from the driver after displaying the third message and entering the drive start disablement state.

4. The battery control system of claim 3, wherein the controller is further configured to determine whether the display, via the user interface, of the third message has been disabled either due to sufficient conditioning of the battery system being achieved or the driver unplugging the vehicle from the external charging system.

5. The battery control system of claim 1, wherein the controller is further configured to:
    determine whether the set of battery parameters satisfy a critical threshold less than the threshold, the critical threshold being indicative of the battery system being insufficiently conditioned for any driving of the vehicle;
    when the set of battery parameters satisfy the critical threshold, allow the driver to drive the vehicle.

6. The battery control system of claim 5, wherein the controller is further configured to, when the set of battery parameters satisfy the critical threshold and the vehicle is not in the drive ready disablement state:
    display, via the user interface, the first message followed by a fourth message indicating that the driver should plug-in the vehicle to the external charging system for conditioning of the battery system; and
    allow the driver to drive the vehicle.

7. The battery control system of claim 5, wherein the controller is further configured to, when the set of battery parameters satisfy the critical threshold and the vehicle is in the drive ready disablement state:
    when the vehicle is running after the driver start request and the driver unplugs the vehicle from the external charging unit, allow the driver to shift the vehicle into a drive, neutral, or reverse gear while simultaneously depressing the brake pedal for a threshold period.

8. A battery control method for a battery electric vehicle, the battery control method comprising:
    communicating, by a controller of the vehicle, with a set of sensors configured to monitor a set of battery parameters of a battery system of the vehicle, the set of battery parameters including at least a state of charge and a temperature of the battery system;
    detecting, by the controller, that a driver door of the vehicle has been opened and connect the battery system to an electrical system of the vehicle to power at least a cabin heater and defroster of the vehicle;
    detecting, by the controller, a driver start request and powered propulsion systems and enable driver control of the cabin heater and defroster of the vehicle;

determining, by the controller, whether the set of battery parameters satisfy a threshold indicative of the battery system being sufficiently conditioned for driving of the vehicle;

when the set of battery parameters satisfy the threshold, displaying, by the controller via a user interface configured to receive inputs from a driver of the vehicle and display messages to the driver, a first message indicating that the vehicle is ready to drive and allow the driver to drive the vehicle;

when the set of battery parameters does not satisfy the threshold, displaying, by the controller via the user interface, a second message that the vehicle is not ready to drive and should be plugged-in to an external charging system for conditioning of the battery system;

in response to the vehicle being plugged-in to the external charging system, allowing, by the controller, driver control of the cabin heater and defroster until the battery system is sufficiently conditioned; and displaying, by the controller via the user interface, a third message indicating that a drive request maneuver is not allowed and a drive start disablement state.

9. The battery control method of claim 8, further comprising displaying, by the controller via the user interface, the third message in response to the driver attempting to shift the vehicle into gear.

10. The battery control method of claim 8, further comprising receiving, by the controller, an override request from the driver after displaying the third message and entering the drive start disablement state.

11. The battery control method of claim 10, further comprising determining, by the controller, whether the display, via the user interface, of the third message has been disabled either due to sufficient conditioning of the battery system being achieved or the driver unplugging the vehicle from the external charging system.

12. The battery control method of claim 11, further comprising:

determining, by the controller, whether the set of battery parameters satisfy a critical threshold less than the threshold, the critical threshold being indicative of the battery system being insufficiently conditioned for any driving of the vehicle;

when the set of battery parameters satisfy the critical threshold, allowing, by the controller, the driver to drive the vehicle.

13. The battery control method of claim 12, further comprising when the set of battery parameters satisfy the critical threshold and the vehicle is not in the drive ready disablement state:

displaying, by the controller via the user interface, the first message followed by a fourth message indicating that the driver should plug-in the vehicle to the external charging system for conditioning of the battery system; and allowing, by the controller, the driver to drive the vehicle.

14. The battery control method of claim 12, further comprising when the set of battery parameters satisfy the critical threshold and the vehicle is in the drive ready disablement state:

when the vehicle is running after the driver start request and the driver unplugs the vehicle from the external charging unit, allow the driver to shift the vehicle into a drive, neutral, or reverse gear while simultaneously depressing the brake pedal for a threshold period.

* * * * *